United States Patent [19]

Benoist

[11] Patent Number: 4,844,615

[45] Date of Patent: Jul. 4, 1989

[54] METHOD AND SYSTEM FOR CORRECTING RANDOM WALK ERRORS INDUCED BY RATE REVERSALS IN A DITHERED RING LASER GYROSCOPE

[75] Inventor: Rodney W. Benoist, Moorpark, Calif.

[73] Assignee: Litton Systems, Inc., Beverly Hills, Calif.

[21] Appl. No.: 8,827

[22] Filed: Jan. 30, 1987

[51] Int. Cl.[4] ............................................. G01C 19/64
[52] U.S. Cl. .................................................. 356/350
[58] Field of Search ........................................ 356/350

[56] References Cited

U.S. PATENT DOCUMENTS

| | | | |
|---|---|---|---|
| 3,743,969 | 7/1973 | Hutchings | 332/7.51 |
| 4,248,534 | 2/1981 | Elbert | 356/350 |
| 4,422,762 | 12/1983 | Hutchings et al. | 356/350 |
| 4,526,469 | 7/1985 | Egli et al. | 356/350 |
| 4,529,311 | 7/1985 | Morgan et al. | 356/350 |
| 4,551,021 | 11/1985 | Callaghan et al. | 356/350 |
| 4,605,307 | 8/1986 | Lim | 356/350 |
| 4,637,723 | 1/1987 | Egli et al. | 356/350 |
| 4,641,970 | 2/1987 | Gustafson et al. | 356/350 |
| 4,648,716 | 3/1987 | Egli | 356/350 |
| 4,657,392 | 4/1987 | Egli | 356/350 |

OTHER PUBLICATIONS

Aronowitz et al., "Positive Scale Factor Correction in the Laser Gyro", *IEEE Journal of Quantum Electronics*, vol. QE-13, No. 5, May 1977, pp. 338-343.

Hammons et al., "Mechanically Dithered RLG at the Quantum Limit", *IEEE Naecon*, pp. 388-392.

Menegozzi et al., "Theory of a Ring Laser", 1973, *Physical Review*, vol. 8, No. 4, pp. 2103-2125.

*Primary Examiner*—Vincent P. McGraw
*Assistant Examiner*—S. A. Turner
*Attorney, Agent, or Firm*—Lynn & Lynn

[57] ABSTRACT

A correction to the output angle of the ring laser gyroscope is calculated as a function of the phase difference and the magnitude of coupling between the two counterpropagating beams when the dither oscillations change direction. A pair of heterodyne detectors produce heterodyne signals indicative of the interference pattern between the counterpropagating beams. A signal indicative of the sum of the separate beam intensities is demodulated with the heterodyne signals to determine the magnitude of coupling between the beams in the ring laser gyroscope.

15 Claims, 6 Drawing Sheets

METHOD AND SYSTEM FOR CORRECTING RANDOM WALK ERRORS INDUCED BY RATE REVERSALS IN A DITHERED RING LASER GYROSCOPE

BACKGROUND OF THE INVENTION

This invention relates generally to rotation sensors and particularly to ring laser gyroscope rotation sensors. Still more particularly, this invention relates to apparatus and methods for reducing the random walk error of a ring laser gyroscope caused by the tendency of the counterpropagating beams of ring laser gyroscopes to lock to a common frequency at low rotation rates.

A ring laser gyroscope employs the Sagnac effect to detect rotation. Two counter propagating light beams in a planar closed loop will have transit times that differ in direct proportion to the rotation rate of the loop about an axis perpendicular to the plane of the loop. The loop need not be planar, but the planar ring laser gyroscope has the simplest type of optical path.

There are in general two basic techniques for utilizing the Sagnac effect to detect rotations. A first technique is the interferometric approach, which involves measuring the differential phase shift between two counterpropagating means injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured.

A ring laser gyroscope has a sensor axis that passes through the closed paths traversed by the counter-propagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

Ring laser gyroscopes may be classified as passive or active, depending upon whether the lasing, or gain, medium is external or internal to the cavity. In the active ring laser gyroscope the cavity defined by the closed optical path becomes an oscillator, and output beams from the two directions can be combined to beat together to give a beat frequency that is a measure of the rotation rate. The oscillator approach means that the frequency filtering properties of the cavity resonator are narrowed by many oders of magnitude below the passive cavity and give very precise rotation sensing potential. To date the major ring laser gyroscope rotation sensor effort has been put into the active ring laser. Presently all commercially available optical rotation sensors are active ring laser gyroscopes.

In the active ring laser gyroscope, the length of the closed optical path is controlled by means of at least one moveable mirror to maintain an intensity maxima. Maximum intensity is achieved when the total closed pathlength contains an integral number (about $10^6$) of the wavelength for which the lasing gain is a maximum. Intensity maxima are found separated by a change of pathlength by one wavelength. The number of wavelengths of the pathlength is referred to as the mode of the laser gyroscope.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold and may be denoted $\Omega_L$. The range of rotation rates over which lock-in occurs is the deadband of the ring laser gyroscope.

Lock-in is believed to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

In addition to causing erroneous rotation rate information to be output from a ring laser gyroscope, lock-in causes standing waves to appear on the mirror surfaces. These standing waves may create a grating of high and low absorption regions, which create localized losses that increase the coupling and the lock-in. The mirrors may be permanently distorted by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance the effective use of ring laser gyroscopes in such systems.

There are several known approaches to solving the problems of lock-in. These approaches take the form of biasing the frequency difference between the counter rotating beams such that the lock-in region is avoided for either all or the greatest part of the operating time of the laser gyroscope. Electro-optical means, such as a Faraday cell or magnetic mirror, may be employed to bias the frequencies; or the laser gyroscope may be biased by the gyro body. Typical practice is to periodically reverse the rate in either the electrical or mechanical methods, since the applied bias is often not known to the accuracy required to permit inertial navigation. Rate reversals permit the bias applied to be averaged out.

The most common successful approach involves mechanically oscillating the ring laser gyroscope about its sensor axis so that the device is constantly sweeping through the deadband and is never completely locked therein. This mechanical oscillation of the ring laser gyroscope is usually called dithering. A typical ring laser gyroscope may be dithered at about 400 Hz with an angular displacement of a few arc minutes.

Dithering is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon. Increasing the length of one side of each blade while shortening the other side causes the blades to flex or bend so that each blade experiences a small rotation about the ring laser gyroscope axis. The voltage is oscillatory so that the blades are constantly vibrating in phase, and the ring laser gyroscope frame mounted to the blades rotates about the axis.

The amplitude of the dithering is generally controlled and monitored. Since the dither oscillation angular velocity and displacement relative to a support structure can be constantly monitored, they may be excluded from the output signal of the ring laser gyroscope. It has been found that a constant dithering amplitude is undesirable due to the residual lock-in error. Typical practice is to superimpose a random signal upon the amplitude of the dither driving amplifier.

Even with dithering there is a residual due lock-in. When the sign or direction of the frequency difference reverses, the two beams tend to lock-in since at some point the frequency difference therebetween is zero. Since the output angle of the ring laser gyroscope is generally derived from the frequency difference, an error accumulates in the output angle. The periods of time when the two beams are locked-in are usually very short so that the resulting output angle error is very small for any single sign change. Nevertheless, the error resulting from lock-in during signal reversal of the frequency difference is cumulative, and in time may become significant, particularly in precision navigational systems. This error is sometimes called random walk or random drift.

A ring laser gyroscope may be mounted upon a gimballed system. Typically in a gimballed mounting system the sensing axes of the ring laser gyroscopes are held fixed relative to an inertial reference or relative to coordinates fixed upon the earth.

Another method for mounting ring laser gyroscopes is to attach them to a vehicle so that the sensor axes are aligned with a set of orthogonal axes on the vehicle. Accelerometers are also attached to the vehicle, and a computer transforms data from the accelerometers and the rotation sensors into navigation coordinates. This configuration is called a strapped down mechanization. Because of its scale factor accuracy and dynamic range, the ring laser gyroscope is more suitable for a strapped down system than a spinning rotor gyroscope. The scale factor accuracy of a ring laser gyroscope is typically five to ten times that of a spinning rotor gyroscope.

U.S. Pat. No. 4,115,004 to Hutchings et al., and assigned to Litton Systems, Inc., assignee of the present invention, discloses a dual spring system that mounts a counterweight to the ring laser gyroscope case to reduce oscillatory motion of the case due to oscillation of the gyroscope. This dual spring system includes a first set of springs mounted between the case and the gyroscope and a second set of springs mounted between the case and the counterweight.

U.S. Pat. No. 4,309,107 to McNair et al., and assigned to Litton systems, Inc., assignee of the present invention, discloses a ring laser gyroscope dither mechanism for isolating vibrational energy generated by dithering the gyroscope and prevents that energy from passing to the mounting case of the gyroscope. McNair et al. discloses a three spring system for mounting a gyroscope to a housing or case, mounting a counterweight to the gyroscope and mounting the counterweight to the case. This arrangement reduces the amount of angular vibrational energy that passes to the case of the gyroscope by using the counterweight to provide a reaction to the oscillations within the gyroscope caused by mechanically dithering to prevent lock-in.

U.S. Pat. No. 3,464,657 to Bullard discloses a single set of springs connected between the frame and mounting platform of an aircraft instrument to isolate vibrational energy from the instrument.

U.S. Pat. No. 3,373,650 to Killpatrick discloses a dithering system in which a varying bias in the frequency is applied to at least one of the counterpropagating beams. Killpatrick discloses a Faraday cell and two quarter wave plates in the path of the counterpropagating light beams. The Faraday cell includes a coil that is energized by an oscillatory current to produce an oscillatory magnetic field that interacts with the counterpropagating beams. The varying bias causes a varying frequency difference between the counterpropagating beams. This frequency difference is generally greater than the frequency difference that occurs at the lock-in threshold. The polarity of the frequency difference is periodically alternated so that the time integral of the frequency difference over the time interval between sign reversals is substantially zero.

U.S. Pat. No. 3,467,472 discloses a dithering system similar to that disclosed by Killpatrick in U.S. Pat. No. 3,373,650. However, that patent discloses randomly changing the amount of bias in order to reduce the random walk resulting from lock-in when the sign change of the bias reverses.

U.S. Pat. No. 4,248,534 issued Feb. 3, 1981 to Elbert discloses a mechanism that sinusoidally dithers a ring laser gyroscope. The output of the ring laser gyroscope is corrected for error caused by lock-in at the extremes of the oscillations. The outputs of a photodiode that measures the light intensity of the interference pattern at each zero dither velocity are accumulated. When the accumulated phase error becomes $2\pi$, an overflow pulse is generated and added to the output of the ring laser gyroscope to correct for accumulated errors caused by lock-in at the zero dither velocity.

U.S. Pat. No. 4,526,469 to Egli et al. discloses a discriminant apparatus for ring laser gyroscopes. The discriminant is related to the weighted vector sum of the coupling of energy between the counterpropagating waves and can be used to indicate relative changes of the magnitude of the lock-in rate. The discriminant is used in a closed loop to alter the path traveled by the counterpropagating waves to adjust the weighted vector sum of the energy coupled therebetween so that the effects of lock-in are reduced.

U.S. Pat. No. 4,529,311 to Morgan et al. discloses the use of an incremental error parameter related to the instantaneous phase difference between the two counterpropagating beams in a ring laser angular rate sensor to generate a set of error parameters that correspond to the contribution of lock-in error in the output of the sensor. The error parameters can be used in a control loop for indirectly reducing the error in the sensor output or the error parameters can be used for a combination of error reduction and compensation.

U.S. patent application No. 448,363 filed Dec. 9, 1982 and assigned to Litton Systems, Inc., assignee of the present invention, discloses a dither controller for a ring laser gyroscope angular rotation sensing system in which a sensor produces a signal indicative of the dither angular motion. The drive circuit for dithering the ring laser gyroscope body is sampled at time intervals that are shorter than the period of the natural oscillation of the ring laser gyroscope body. The absolute values of the samples are averaged to obtain a measure proportional to the average of the peak amplitude of the dither oscillation signal. When the peak amplitude decays to a predetermined minimum value, a driving torque is applied to the ring laser gyroscope. When the sum of the samples increases to sufficiently, the ring laser gyroscope is allowed to oscillate at its natural frequency while the amplitude slowly decays to the minimum value at which the driving torque is applied again. By this means, the maximum dither input rate, and the dither depth, are controlled on average to the desired value.

SUMMARY OF THE INVENTION

The present invention overcomes disadvantages of prior lock-in error correction techniques by providing an effective method for reducing the random walk error of a ring laser gyroscope that is body dithered at a frequency $\omega_D$ and a dither depth $B_m$ about a sensor axis. The output of the ring laser gyroscope is a measure of the angle of rotation about the sensing axis by means of a beat signal formed by interference of two counterpropagating light beams. A major portion of the random walk error in output of the dithered ring laser gyroscope is the residual error of lock-in as the gyroscope input rate passes through the lock-in region. The present invention generates an accumulated correction in software for each transversal of the lock-in region. The accumulated correction is derived from information from the heterodyne signals and the individual beam intensity signals.

One advantage of the present invention over prior lock-in error correction techniques is that no active mechanical control of ring laser gyroscope dither, cavity length control, or heterodyne readout electronics is required. Another advantage of the present invention is that the correction formed is valid over changes in the lock-in parameter $B_L$ and other associated coefficients that can not be predicted by calibrations of lock-in prior to operational use of the ring laser gyroscope. An example of unpredicted influences on the lock-in parameter is the acquisition of a different cavity length mode than originally anticipated. Very minor particle contamination of the mirror surface or alignment change of the position of the beams in use can have significant effect on lock-on parameters. Variation of lock-in over the thermal range required for operational use of the laser gyroscope can be so large as to make other prior techniques unusable.

The method according to the present invention comprises the steps of measuring the phase of the heterodyne signal at the turnaround points of the dither cycle, $\phi_H$; measuring the optical phase position of the heterodyne signals with respect to the phase difference of the counterpropagating beams, $\epsilon$; measuring the magnitude of coupling between the counterpropagating beams, $B_L$; and calculating a correction to the output angle of rotation for every turnaround. The correction for each turnaround is also a function of the change of direction of motion for the turnaround and the dither parameters $\omega_D$, and $B_m$, where $B_L$ and $B_m$ are scaled in radian units such that every $2\pi$ radians is one output count of the gyro.

The method according to the present invention comprises the steps of measuring the phase difference $\Psi_T$ of the two beams when the dither changes direction; measuring the magnitude $B_L$ coupling between the two beams; and calculating a correction to the angle of rotation as a function of the coupling $B_L$ between the two beams. The method of the invention may further include the step of detecting changes in direction of the dither oscillations. The method of the invention preferably includes the step of calculating a correction to the angle of rotation according to the equation $\Delta\Psi$ correction $= B_L[2\pi(B_m\omega_d)^{-1}]^{1/2} \sin(\Psi_T \pm \pi/4)$, where $\Psi_T = \phi_H + \epsilon$, and the choice of sign for the $\pi/4$ factor is a function of the change in direction of the dither.

The step of determining the magnitude of the coupling between the beams may include the steps of detecting changes in direction of the dither oscillations; measuring the intensity of a first one of the beams; measuring the intensity of the other of the beams; and adding signals indicative of the intensities of the two beams to form a sum signal. The step of determining the magnitude of the coupling between the beams may include the steps of forming a heterodyne signal indicative of the beat frequency produced when the counterpropagating beams interfere with one another; and demodulating the sum signal with the heterodyne signal.

The apparatus of the present invention includes means for detecting the intensities of the separate beams in the ring laser gyroscope and means for forming a signal indicative of the sum of the two detected signals. The apparatus includes a pair of heterodyne detectors that monitor the interference pattern between the counterpropagating beams and means for determining when the rate of change of both heterodyne output signal are zero to determine the phase difference of the two beams when the dither oscillations change direction. The apparatus further includes means for demodulating the sum signal with the heterodyne signals produced from the interfering beams and means for processing the demodulated signals to determine the magnitude of coupling between the counterpropagating beams in the ring laser gyroscope and the optical phase position of the heterodyne detectors with respect to the counter propagating beams.

A system according to the invention for reducing the random walk error of a ring laser gyroscope that is body dithered at a frequency $\omega_D$ and an dither depth $B_m$ about a sensor axis, a beat signal formed by interference of two counterpropagating light beams indicating rotation of an angle $\Psi$ about the sensor axis, comprises means for measuring the phase difference $\Psi_T$ of the two beams when the dither changes direction; means for measuring the magnitude $B_L$ of coupling between the two beams when the dither changes direction; and means for calculating a correction to the angle of rotation as a function of the coupling $B_L$ between the two beams. The system of the invention may further include means for determining whether the change in direction of the dither is counterclockwise to clockwise or clockwise to counterclockwise.

The system according to the invention preferably includes means for measuring the intensity of a first one of the beams; and means for adding signals indicative of the intensities of the two beams to form a sum signal. The system according to the invention may further include means for forming a heterodyne signal indicative of the beat frequency produced when the counterpropagating beams interfere with one another; and means for demodulating the sum signal with the heterodyne signal.

A system according to the invention for reducing the random walk error of a ring laser gyroscope that is body dithered at a frequency $\omega_D$ and a dither depth $B_m$ about a sensor axis, a beat signal formed by interference of two counterpropagating light beams indicating rotation of an angle $\Psi$ about the sensor axis may also comprise means for producing a plurality of heterodyne signals indicative of the light intensity resulting from interference of the two light beams. A turnaround detector preferably includes means for detecting the phase of the heterodyne signals when the dither oscillations change direction and including means for determining whether the change in direction of the dither oscillations is clockwise to counterclockwise or counterclockwise to clockwise. The system also preferably includes means for producing a pair of signals indicative of the intensities of each of the two light beams and an intensity demodulator connected to receive the beam intensity signals and connected to the turnaround detector to receive the heterodyne signals therefrom. The intensity demodulator preferably includes means for determining the magnitude of coupling between the two light beams and for determining the phase difference between the heterodyne signals and the counterpropagating light beams.

The present invention therefore provides an effective means for reducing the ring laser gyroscope random walk error over variation of error sources such as temperature, aging and operation on different cavity length control modes.

The invention also provides means for determining the optical phase placement of the individual heterodyne detectors and the change of phase placement as the temperature changes. A complete cycle of $2\pi$ optical phase of the heterodyne detectors is a single count error in the gyro output. This error is not a random walk error, but may be calibrated and corrected using the apparatus of the present invention.

The invention further provides means for determining the magnitude of beam coupling in a laser gyroscope and means for tracking relative changes of the random walk error without requiring hardware and software associated with gyro counts nor requiring a constant input rate. The laser gyro may be in operational use as opposed to being fixed on a test stand while the beam coupling and random walk error are monitored.

DESCRIPTION OF THE PREFERRED EMBODIMENT

Figure 1:
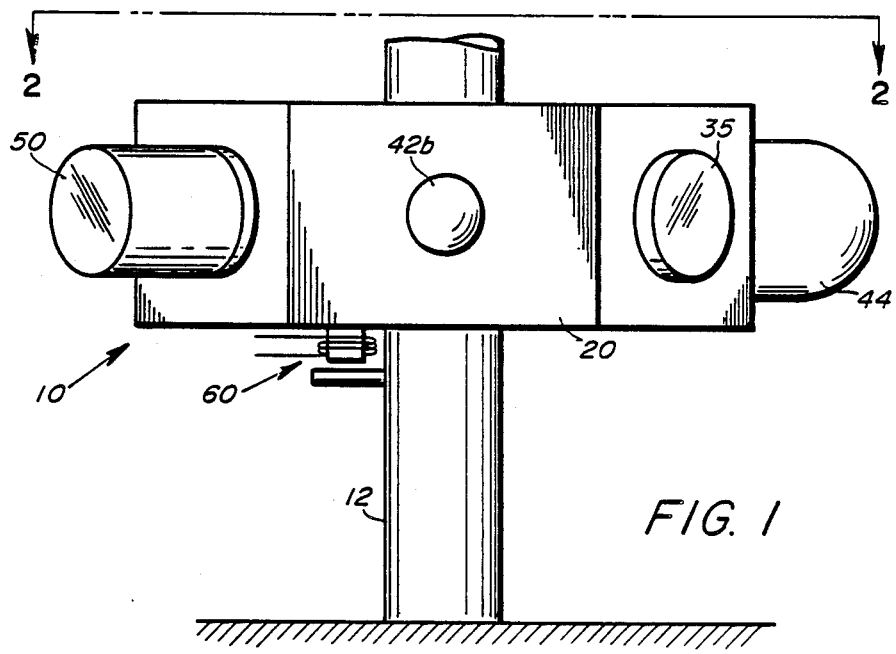
FIG. 1 is a perspective view of a ring laser gyroscope mounted upon a supporting structure.
Figure 2:
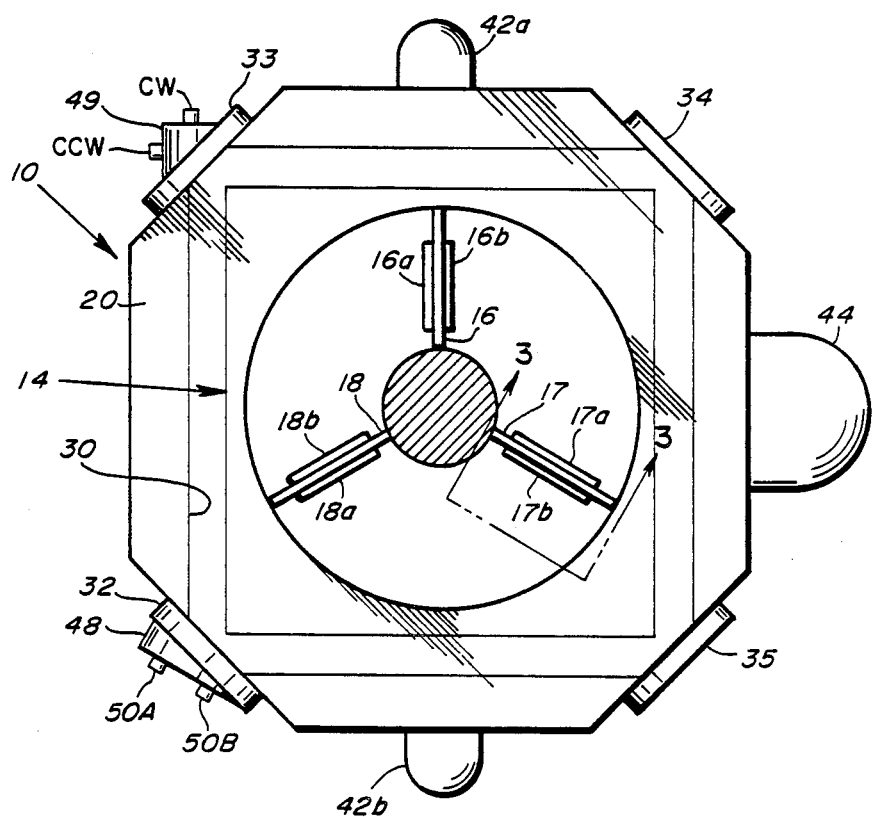
FIG. 2 is a plan view of the ring laser gyroscope of FIG. 1.

Referring to FIGS. 1 and 2, a ring laser gyroscope 10 in mounted on a support 12. The ring laser gyroscope 10 is exemplary of many such devices with which the present invention may be practiced and does not limit the present invention to the particular embodiment of the ring laser gyroscope 10 shown in FIGS. 1 and 2 and described herein.

Figure 3:
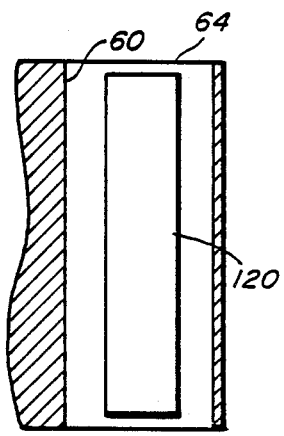
FIG. 3 is a partial cross sectional view along line 3—3 of FIG. 1 showing a piezoelectric drive mounted to a dither spring.

The ring laser gyroscope 10 is supported by a flexure mechanism 14 that comprises a plurality of springs 16-18 connected between a frame 20 and the support 12. The illustrated embodiment includes three springs, but the invention may be practiced with any number of springs. Referring to FIGS. 2 and 3, the springs 16-18 may be formed as thin rectangles, but the present invention is not limited in its applicability to springs having such configurations.

Referring to FIGS. 2 and 3, a pair of piezoelectric wafers 16A, 16B, 17A, 17B, 18A and 18B are mounted on the springs 16-18, respectively. All of the spring and wafer combinations are essentially the same; therefore, only spring 16 and piezoelectric wafers 16A and 16B are described herein. The piezoelectric wafers 16A and 16B have generally rectangular configurations and are mounted on the opposite side of the spring 16. The piezoelectric wafers 18A and 16B preferably are mounted to the spring 16 by a suitable bonding agent.

The piezoelectric wafer 16A is poled such that application of a driving voltage across it causes the piezoelectric wafer 16A to selectively expand or contract. The piezoelectric wafer 16B is also poled and has a pair of opposing electrodes 26 and 28 connected thereto. The piezoelectric wafers 16A and 16B may have opposite polarities so that application of the same driving signal thereto causes one wafer, for example wafer 16A, to expand while the other wafer 16B contracts. If the wafers 16A and 16B have the same polarities, then the driving voltages must have opposite polarities in order to achieve the desired effect of alternately expanding and contracting. The piezoelectric wafers 17A, 17B, 18A and 18B have polarities and driving voltages substantially identical to the piezoelectric wafers 16A and 16B, respectively. Therefore if the piezoelectric wafers 16A, 17A and 18A contract while the piezoelectric wafer 16B, 17B and 18B expand, the springs 17, 17 and 18 will deform so that the frame 20 rotates clockwise about the support 12. A change in sign of the driving voltage causes a counterclockwise rotation of the frame 20 about the support 12.

Referring to FIG. 2, a cavity 30 formed in the frame 20 extends between a plurality of mirrors 32–35, which guide light around a closed path inside the cavity 30. A gain medium 38 is confined inside the cavity 30. The gain medium is typically comprised of a mixture of helium and neon gases. Application of an excitation voltage to a pair of anodes 42A and 42B and a cathode 44 causes energy level transitions in the gas mixture, as is well-known, to produce counterpropagating coherent light beams in the cavity 30.

The two counterpropagating beams undergo a rotation induced phase shift in circulating around the cavity 30 by successive reflection from the mirrors 32–35 as the cavity 30 rotates about its longitudinal axis. The rate of change of the difference in the phase of the two counterpropagating beams is indicative of the rotation rate of the ring laser gyroscope 10 about its longitudinal axis. Since the cavity 30 acts as a resonant cavity to the two beams, the frequency of each beam is sharply defined so that the phase shift changes are detectable.

One of the mirrors, for example the mirror 32 is partly transmissive so that a portion of each beam enters a prism 48 mounted to the back of the mirror 32. The prism 48 is formed to combine, or heterodyne, the counterpropagating beams so that they interfere with one another before impinging upon a pair of photodetectors 50A and 50B. The combined beams produce interference fringes that move across the detectors 50A and 50B. The outputs of the detectors 50A and 50B are generally called heterodyne signal. The signals output from the detectors 50A and 50B are referred to herein as heterodyne signal A, or het A, and heterodyne signal B, or het B, respectively. The frequency difference, or beat frequency, of the two beams is seen as motion of the interference fringes across the detectors 50A and 50B. Accordingly, the direction of the motion of the fringes identifies the direction of rotation. Each full cycle of the interference pattern corresponds to $2\pi$ radians of phase, or a cycle of the beat frequency, and, therefore corresponds to fixed angular rotation increment. Each occurrence of a full cycle of the interference pattern generates a signal called a heterodyne count. For a ring laser gyroscope 10 having a 28 cm path length, the scale factor is about 1.8 arc seconds of rotation per heterodyne count.

Figure 4:
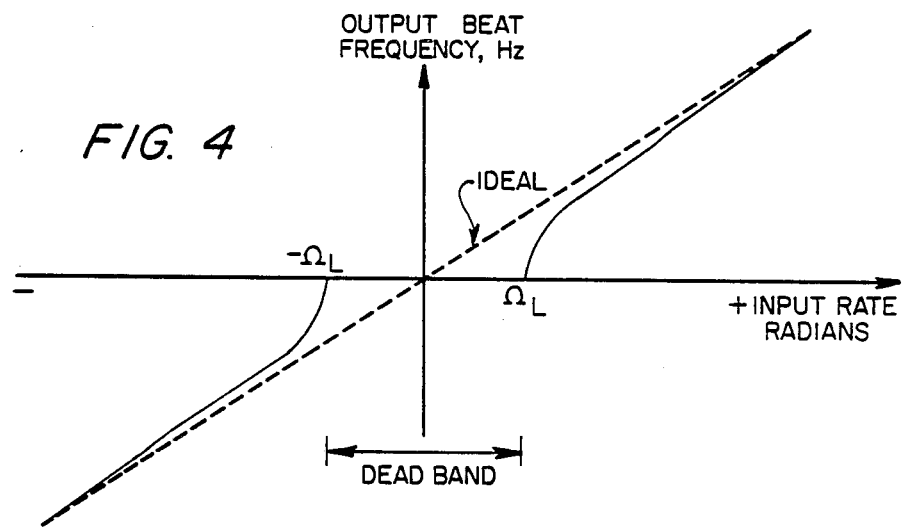
FIG. 4 graphically illustrates the output beat frequency of a ring laser gyroscope as a function of rotation rate.

The frequency of the beat signal produced when the two frequencies heterodyne at the detectors 50A and 50B is directly proportional to the rotation rate of the ring laser gyroscope 10 about its longitudinal axis. Referring to FIG. 4, when the rotation rate of a simple, unbiased ring laser gyroscope 10 is reduced to the lock-in threshold rate $\Omega_L$, the counterpropagating beams lock at the same frequency. The frequencies of the counterpropagating beams are the same for a range of rotation rates $\pm \Omega_L$, which is the lock-in deadband shown in FIG. 4. The signal output from the ring laser gyroscope 10 becomes non-linear in the vicinity of the deadband, which is a departure from the output of an ideal ring laser gyroscope.

Figure 5:
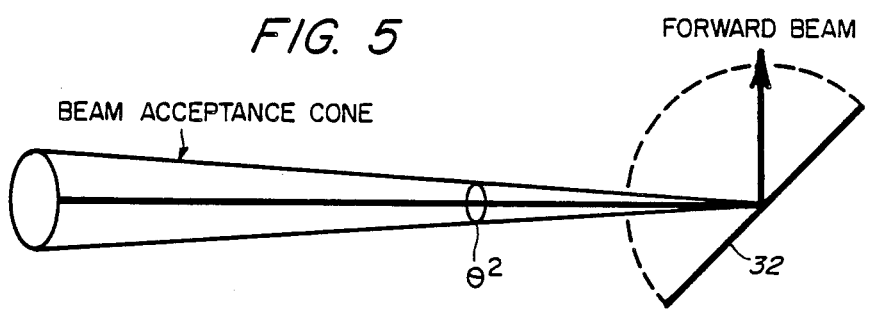
FIG. 5 illustrates forward reflected and backscattered light from a mirror of the type that may be included in the ring laser gyroscope of FIG. 1.

Referring to FIG. 5, lock-in is believed to be causes primarily by radiation backscattered from the mirrors 32–35. Since the counterpropagating beams strike each of the mirrors 32–35 at an angle of incidence of 45°, there would be no backscattered radiation from ideal, perfectly flat mirrors. The main portion of each beam is forward reflected from the mirror 32, for example, according to the laws of reflection. However, even though the mirrors 32–35 are of very high quality, surface imperfections cause some specular reflection of each beam in all directions. Light from one beam that is backscattered into an acceptance solid angle for the oppositely directed beam couples thereto. The acceptance solid angle depends upon the wavelength of the light and the diameter of the cavity 30. For a typical square ring laser gyroscope 10 having a 45° angle of incidence, about one part in $10^6$ of the total specular reflection from any one of the mirrors 32–35 is scattered into the acceptance angle of the counterpropagating beam.

Figure 6A:
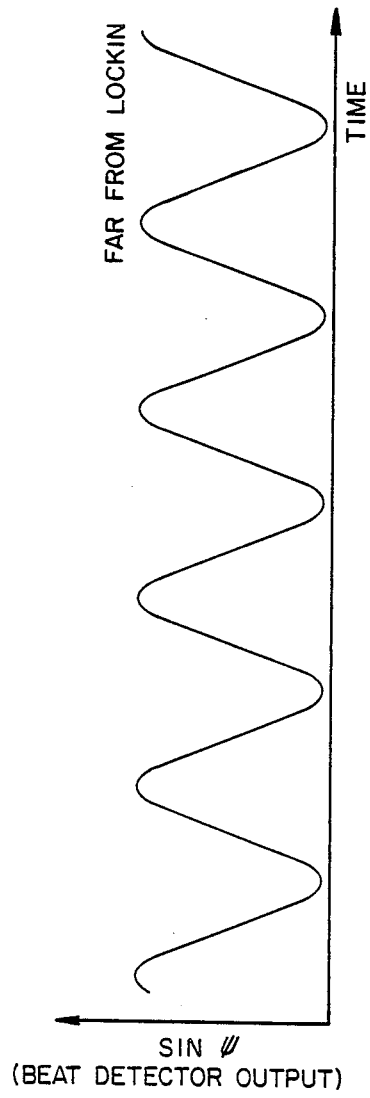
FIGS. 6A and 6B illustrate the output waveform of the ring laser gyroscope of FIG. 1 for rotation rates far from the lock-in threshold and near the lock-in threshold, respectively.
Figure 6B:
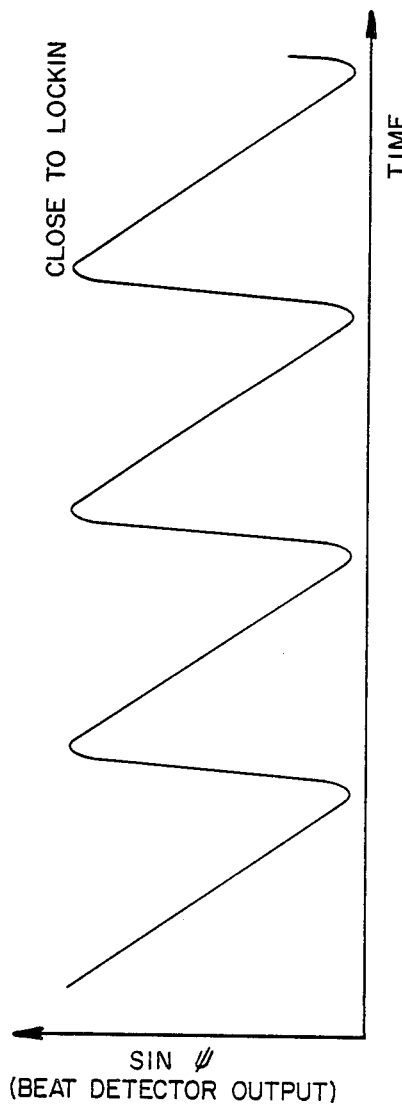

Referring to FIG. 6A, the output of the detector 50 as a function of time is sinusoidal when the rotation rate is far from the lock-in threshold. Referring to FIG. 6B, when the rotation rate is near the lock-in threshold, the output of the detector 50 is distorted from the desired sinusoidal waveform. For a typical ring laser gyroscope having a cavity length of 49 cm, the lock-in threshold is about 100°/hr. Therefore, obtaining satisfactory results from the ring laser gyroscope 10 requires avoidance not only of lock-in but also avoidance of the rotation rates near the deadband.

The differential equation relating the input rate, the output rate and the lock-in error is $$\dot{\Psi} = \omega + B_L \sin(\Psi) \tag{1}$$

where:

$\dot{\Psi}$ is the frequency difference between the counterpropagating beams;

$\Psi$ is the phase difference in radians between the counterpropagating beams;

$\omega$ is the input rotation rate; and $B_L$ is the lock-in rate.

The above equation facilitates understanding of the lock-in phenomenon. For $\omega \leq B_L$, there is a value of $\Psi$ such that $\dot{\Psi} = 0$, and there are no output counts from the ring laser gyroscope 10. A typical value of $B_L$ is 0.1°/sec, which is many times the earth's rotation rate. If an oscillatory bias is applied to the ring laser gyroscope 10 by mechanically dithering the frame, the input rotation rate is $$\omega = \omega_o + B_m \cos(\omega_D t) \tag{2}$$

and the phase difference is $$\dot{\Psi} = \omega_o + B_m \cos(\omega_D t) + B_L \sin \Psi \tag{3}$$

where $\omega_o$ = non-dither input rate;

$\omega_D$ = dither angular frequency; and $B_m$=dither depth rate, which is the maximum value of the dither angular velocity per cycle of dither.

Even with dither the residual effects of coupling between the counter propagating beams are not negligible. For low rotation rates an error arises in the ring laser gyroscope 10 at points of reversal of the direction of the dither oscillations. This error is cumulative and is a major source of error in ring laser rotation sensors. The nature of the residual lock-in error is a random walk in the output angle of the ring laser gyro. Output random walk is analytically described as white noise in angle rate, and is parameterized by the laser gyro random walk coefficient. The mathematical relationship between the lock-in coefficient, $B_L$, the dither parameters, and the random walk coefficient is derived by Hammons and Ashby, "Mechanically Dithered RLG at the Quantum Limit", IEEE NAECON 1978, which is hereby incorporated by reference into the present disclosure. Equation (3) above for the counterpropagating beam phase difference of the dithered laser gyro is used to calculate the random accumulative error of the lock-in error term $B_L \sin \Psi$. In a similar manner it is possible to analytically calculate the contribution of the error term for each pass through the lock band which occurs twice per dither cycle. It is found that the error for each pass through the lock band may be written as $$\Delta\Psi = B_L[2\pi(B_m\omega_D)^{-1}]^{1/2} \sin(\Psi_T \pm \pi/4) \quad (4)$$

where $\Psi_T$ is the value of the phase difference of the counterpropagating beams at the instant of turnaround and the choice of sign for the $\pi/4$ term is determined by the direction of reversal at turnaround: ccw to cw or cw to ccw.

It is therefore theoretically possible to calculate the residual dither error and thereby form a correction for every turnaround. This correction to be summed to the output counts of the gyroscope. The dither parameters $\omega_D$ and $B_m$ are controlled variables which vary a few percent from cycle to cycle. A method of control is described in U.S. patent application No. 448,363, which is mentioned in the Background of the Invention section of this disclosure and hereby incorporated by reference into this disclosure. For the purposes of forming a correction the dither variables may be taken as their average values. The key variables to form the correction are the value of $\Psi_T$ at each turnaround and the value of the lock-in rate, $B_L$, which is a measure of the coupling (backscattering) between the beams.

Since the phase difference between the beams is measured by means of optical interference at the heterodyne detector, the two deterodyne detector outputs become the basis for detecting turnarounds. A difficulty with using a turnaround phase difference, $\phi_H$, derived from the heterodyne signals is that the heterodyne is offset from the coupling phase by a phase value, $\epsilon$, that is a function of the optical placement of the heterodyne detector. This offset may be written as $\Psi_T = \phi_H + \epsilon$. Further, the magnitude of the correction must be properly scaled to the magnitude of the coupling coefficient, $B_L$, between the two beams. Both $\epsilon$ and $B_L$ are functions of the time and temperature. The present invention comprises an apparatus and a method for determining the phase value $\epsilon$ and the magnitude of the coupling coefficient $B_L$ from the sum of the intensity fluctuations of the individual beams using synchronous demodulation techniques with the two heterodyne signals as references.

The physical coupling of the two counterpropagating beams affects both the frequency difference of the two beams and the intensity of the two beams with the input rate as the driving factor. The laser gyro equations for the frequency and intensity modulations along with experimental results may be found in several sources, for example in Aronowitz and Lim, "Positive Scale Factor Correction in the Laser Gyro" IEEE Journal of Quantum electronics, Vol. QE-13, No. 5, May, 1977. It is the method of this article, and other similar literature articles, to rewrite the basic ring laser equations for the single beam intensities and single beam frequencies in terms of a sum of intensity variable and a difference of frequency variable. The frequency pulling effects due to lock-in can be associated with the sum intensity variable under appropriate simplifying assumptions. In the development of the present invention it was discovered that for the class of ring laser gyroscopes described herein, the physically derived sum intensity signal may be used to derive the coupling variables required to perform a turnaround correction.

Figure 7:
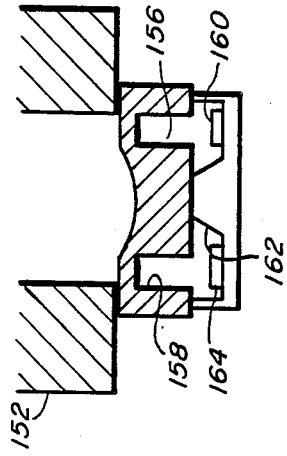
FIG. 7 is a block diagram of the turnaround correction device of the present invention.

FIG. 7 shows the basic concept of the present invention. The mounting block 49 shown on FIG. 2 separates the laser beams into two discrete beams rather than causing them to interfere as is the case with the prism 48. The two beams labelled CW and CCW in FIG. 7 may be processed to control length of the cavity 30. In the present invention these separate beams are also used to monitor the phase relationship between the two counterpropagating beams in the ring laser gyroscope 10 and the heterodyne detectors 50A and 50B. These separate beam are further used in the present invention to determine the magnitude of the coupling between the two counterpropagating beams in the ring laser gyroscope 10. The electrical signals indicative of the separate light beams are added together and demodulated with the heterodyne signals from the detectors 50A and 50B. The demodulated signals are processed to determine the phase relationships between the heterodyne signals and the sum signal. The magnitudes of the demodulated signals can be used to establish the scale of the angular correction. The heterodyne signals are input to a turnaround detector 90, which produces a signal indicative of the phase $\phi_H$ at turnaround and a signal indicative of the rotation sense of each turnaround. The heterodyne signals are output from the turnaround detector 90 to an intensity demodulator 92, which also receives signals indicative of the intensities of the single beams propagating in ring laser gyroscope 10.

Figure 8:
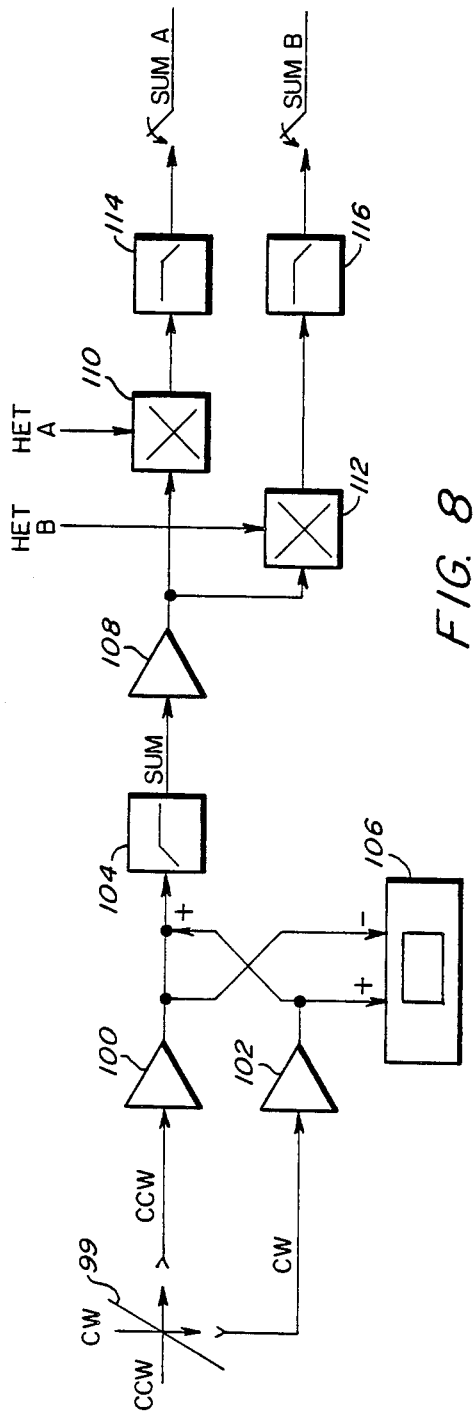
FIG. 8 is a block diagram of an intensity demodulator included in the turnaround correction device of FIG. 7.

FIG. 8 is a block diagram of the intensity demodulator 92 of FIG. 7. Referring to FIG. 8, the two separate signals CW and CCW, which are indicative of the separate beam intensities, are transmitted by partially reflecting mirror 99, detected and input to a pair of amplifiers 100 and 102, respectively. The amplifiers have gains that are adjustable to compensate for differences in photodetector response. The outputs of the amplifiers 100 and 102 are summed and then input to a highpass filter 104 to reduce the error caused by imbalances that may still exist in the gains of the amplifiers 100 and 102. The amplified intensity sum signal is monitored with suitable monitoring means such as an oscilloscope 106 to determine whether it is necessary to adjust the gains of the amplifiers 100 and 102. The sum signal is amplified by a variable gain amplifier 108 with the gain of the amplifier 108 being adjusted to avoid clipping of the sum signal at the maximum value thereof, which is ordinarily a function of temperature. It is necessary to adjust the gains of amplifiers 100, 102, and 104 only for initial calibration. Once set no further adjustment is necessary.

The output of the amplifier 108 is input to a pair of demodulators 110 and 112 that also receive inputs from the heterodyne detectors A and B, respectively. The outputs of the demodulators 110 and 112 are input to low pass filters 114 and 116, respectively. The outputs of the low pass filters 114 and 116 are sampled to obtain a sum A signal and a sum B signal, respectively.

Figure 9:
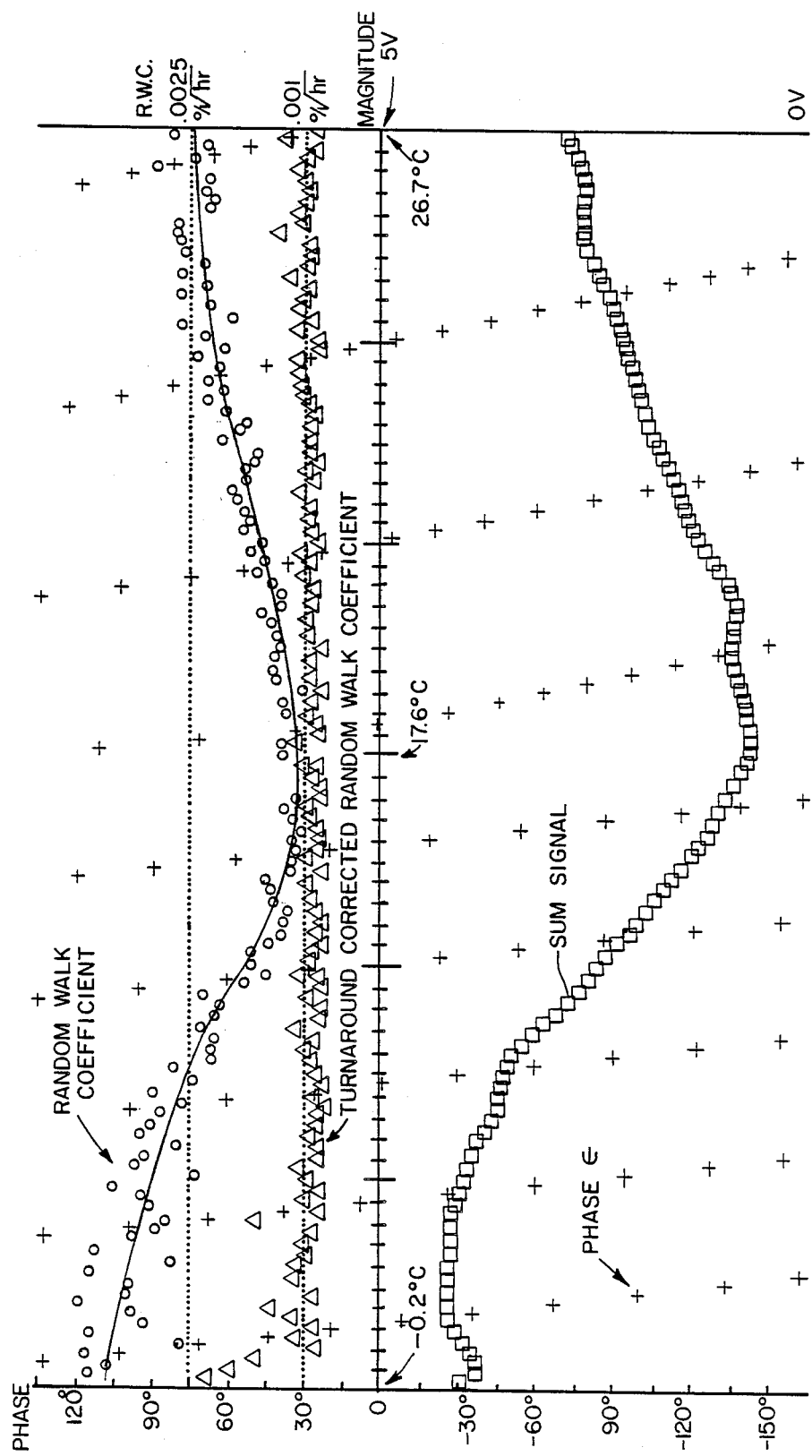
FIG. 9 graphically represents variations of the random walk coefficient, the magnitude of the sum signal and the phase of the sum signal as functions of temperature for the ring laser gyroscope of FIG. 1.

FIG. 9 graphically displays data taken with the ring laser gyroscope 10 to show the effect of the turnaround correction method of the invention as a function of temperature. The graphs include plots of the parameters $\epsilon$ and $B_L$ of the sum signal as functions of temperature. Temperature, random walk coefficients, and sum signal parameters are plotted using appropriate units and scale factors. The graphs of FIG. 9 show that the random walk coefficient as a function of temperature has the same general variation as the magnitude of the sum signal. Therefore, the magnitude of the sum signal may be processed to determine the random walk coefficient. The random walk coefficients were calculated every minute based upon sixty samples, each taken for a time of one second. For this gyro the optical phase of the heterodyne signal is seen to rotate a full cycle for each 3° C. temperature change. The turnaround correction to the output signal was generated for each dither turnaround as $$\Delta \Psi_{correction} = B_L [2\pi(B_m \omega_d)^{-1}]^{\frac{1}{2}} \sin(\phi_H + \epsilon \pm \pi/4), \quad (5)$$

where the variables are previously defined. The sign of the $\pi/4$ term in the above equation depends upon whether the turnaround is ccw to cw or cw to ccw. The positive sign is used when the turnaround is cw to ccw.

The turnaround correction of the present invention is based upon the theory that the accumulating beat phase error is predictable from the beam intensity fluctuations. The turnaround correction method comprises determining the turnaround points and sampling the appropriate signals related to the beam intensity to generate a correction signal. The corrections for each turnaround are accumulated and added to the heterodyne pulse counts when the magnitude of the correction exceeds the count resolution.

The present invention provides the capability of removing all of the residual body dither error so that only the quantum limit of about $3 \times 10^{-4°}(hr)^{-0.5}$ contributes to the rate noise. In practice, however, the accuracy of measuring the turnaround and variations of dither motion limit the improvement.

Referring to FIG. 9, the random walk coefficient calculated for the corrected gyro samples shows that the phase error is not random, but is sinusoidally related to the turnaround point. The residual dither error may be calculated if both the phase of the beat signal at each turnaround and the lock-in coefficient $B_L$ are known. Since the ring laser gyroscope 10 is typically dithered at a frequency of about 400 Hz and since there are two turnarounds per dither cycle, the turnaround phase must be determined at twice the dither frequency or at about 800 Hz.

The fluctuations in the beam intensities are directly related to the instantaneous beat phase and amplitude. However, the intensity modulation is only about 1% to 5% of the total intensity of each beam, and the intensities are noisy because of other electrical and mechanical effects that modulate the beams. In theory it is possible to detect the turnaround and turnaround phase in the phase of the separate beams. In practice, it is easier to detect the turnaround and turnaround phase by means of the two heterodyne signals, which provide a direct measure of the beat phase at the location of the heterodyne detectors 50A and 50B. Use of the heterodyne signals has the disadvantage that the turnaround phase of the heterodyne signals is not identical to the coupling phase of the beams, but is offset by a fixed phase amount that is determined by the geometry of the placement of the detectors 50A and 50B. This phase offset can be determined by means of feedback circuitry described subsequently. The feedback circuitry also provides a measure of the amplitude of cross beam coupling that may be used to provide a measure of the lock-in coefficient and scale the correction.

Figure 11:
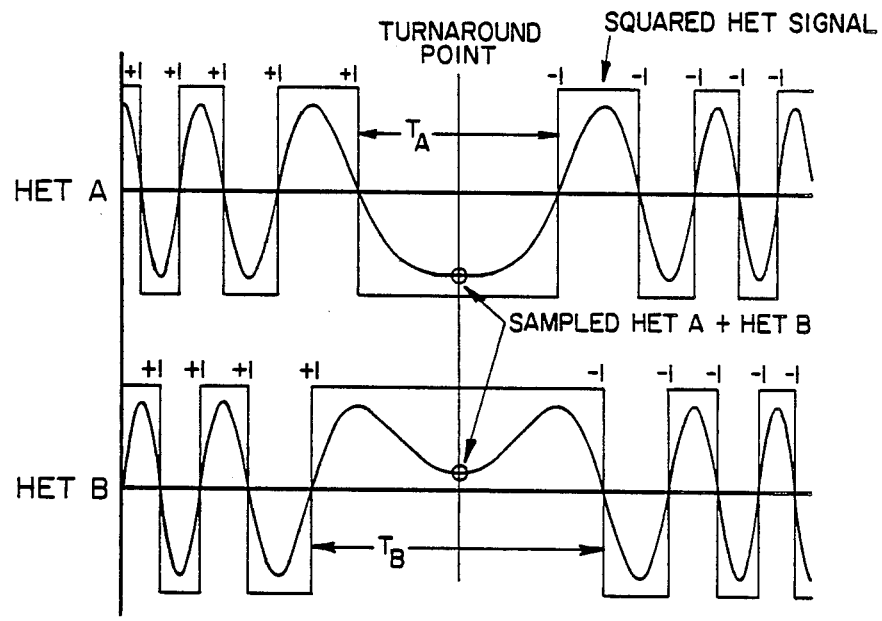
FIG. 11 graphically illustrates analog signals representative of the outputs of two heterodyne photodetectors included in the ring laser gyroscope of FIG. 1 just before and just after a turnaround in the dither motion.

FIG. 11 graphically illustrates the analog signals representative of the output of the two heterodyne photodetectors immediately before and after a turnaround. FIG. 11 also shows the squared logic signals that may derived from the heterodyne signals for the purpose of driving the output logic counters. Typical practice is to assign a count value to each edge of the two squared signals by means of discrete hardware logic. By this means the nominal 2 arc second scale factor per complete fringe motion is scaled to 0.5 arc second per count. FIG. 11 shows the reversal of lead and lag between the heterodyne A signal and the heterodyne B signal that occurs at turnaround. At the point of turnaround the rate of change (slope) of each analog signal is zero. This characteristic is used to detect the turnaround point for the purpose of sampling the heterodyne signals at turnaround.

The circuitry also generates a ready signal and a rotation sense signal. The ready signal notifies the computer that data is ready for processing. The rotation sense signal is indicative of which turnaround (ccw/cw or cw/ccw) was detected. The computer uses the track signal to return the turnaround detect circuit to the tracking mode after completing the processing of a turnaround. The magnetic pickoff signal provides the rotation sense signal and also provides means for detecting the velocity of the dither oscillations. Limiting the period of turnaround detection to the portion of the dither having the lower absolute value of the rate eliminates false detections of simultaneous zero slopes at high rates. A further advantage of the circuitry is that no turnaround is indicated when input rotation rates move the inertial turnaround away from the dither turnaround and outside a predetermined velocity range.

In the ring laser gyroscope 10, the length of the cavity is controlled by translating the mirror 33 to shorten or lengthen the cavity. The cavity changes length as the temperature of the frame changes. These changes in length change the resonant frequency of the cavity, which should be held constant. U.S. Pat. No. 4,383,763 which issued May 17, 1983 to Hutchings et al., assignees to Litton Systems Inc. describes apparatus and method for controlling the path length of the ring laser gyroscope 10 by flexing a mirror. That patent is hereby incorporated by reference into the present disclosure. Other cavity length control techniques may be used with the present invention. U.S. patent application No. 656,944, filed Oct. 2, 1984 for Pathlength Controller for Ring Laser Gyro and assigned to Litton Systems, Inc. describes a pathlength control system that may be used with the present invention. That application is incorporated by reference into this disclosure.

Figure 10:
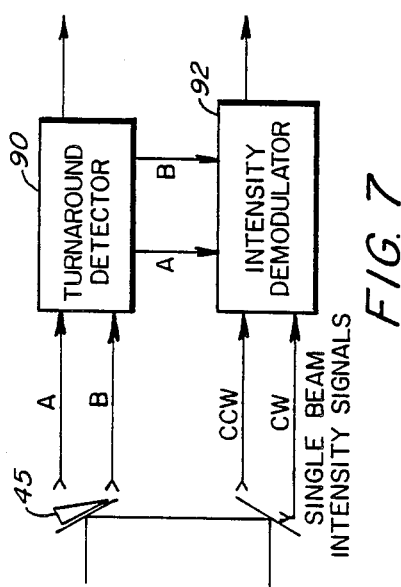
FIG. 10 illustrates a path length control system that may be included in the ring laser gyroscope of FIGS. 1 and 2.

Referring to FIG. 10, the mirror 33 may be formed as a diaphragm. The outer edges 150 of the mirror 33 are connected to a generally cylindrical support 152. A generally cylindrical post 156 extends from the back of the central portion of the mirror 33. An annular cavity 158 is between the support 152 and the post 156. The region of the mirror 33 adjacent the cavity 158 is very thin and permits axial movement of the center of the mirror 33 and the post 156. A thin membrane 160 supports a bearing member 162 adjacent an end 164 of the post 156. A plurality of piezoelectric transducers 164 are mounted to the sides of the thin membrane 160 so that application of a voltage to them causes the membrane 160, the bearing member 162, the post 156 and the mirror 33 to move along the axis of the post 156.

Figure 12:
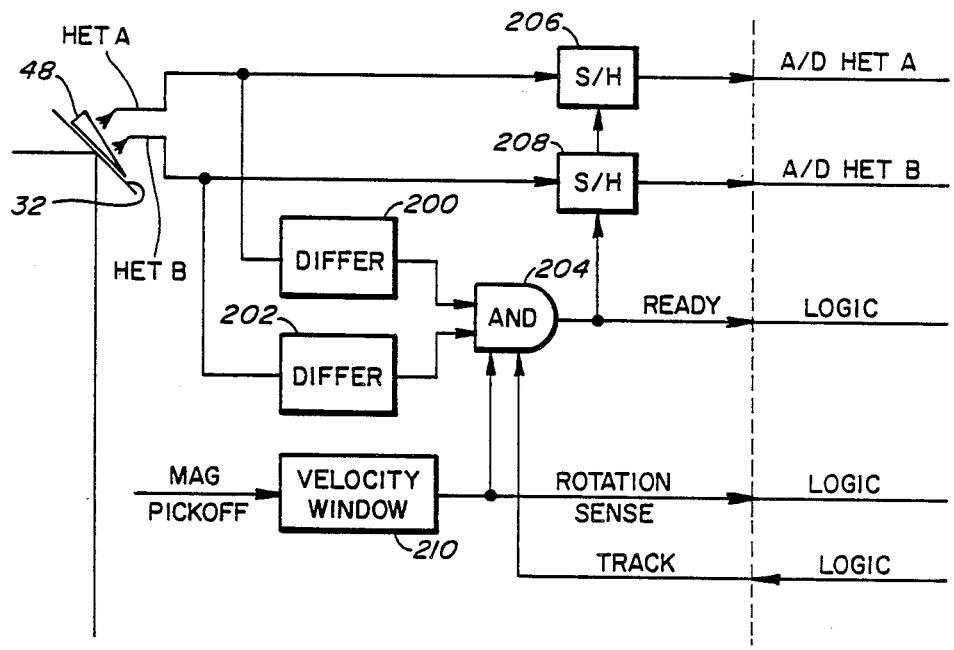
FIG. 12 is a block diagram of an analog turnaround detector based on detecting the point in time when the rate of change of the two heterodyne signals is identically zero.

FIG. 12 is a block diagram of the circuitry that may comprise turnaround detector 90 of FIG. 7. A signal representative of the rate of change of each of the heterodyne signals is formed by differentiating circuits 200 and 202. The two differentiated signals are input to an AND gate 204 to determine the instant of each turnaround. The period in which a valid simultaneous detection of zero slope of the two heterodyne signals is accepted as a valid turnaround is restricted by forming a velocity window 210 based on the magnetic pickoff 60. The magnetic pickoff 60 produces electrical signals that depend upon the angular velocity of the frame 20 relative to the support 12. The purpose is to avoid spurious detection of turnarounds. The heterodyne signals are input to sample and hold circuits 206 and 208, which latch to the values of the heterodyne signals at the sampling time. A logic value representative of the rotation sense (direction of turnaround) is also latched along with a ready signal to provide input to a computer (not shown) that a turnaround has been detected. By means of trigonometric logic using the sampled value of het A (heterodyne A) and het B, the phase of the heterodyne turnaround $\phi_H$ is determined with reference to het A. The het A and het B signals represent the sampling of a sinusoid at intervals 90° apart. This logic includes an estimation function of the peak magnitude of het A. Thus, build variation or slow time variation of the magnitude of het is not a limiting factor of the invention. The track logic signal discrete resets the turnaround detector in the state to detect the next turnaround after the computer has read the sampled signals.

Alternate methods of detecting the turnarounds and determining the phase of the turnarounds in the heterodyne signals are possible without departing from the scope of this invention. The squared heterodyne signals may also be used to detect heterodyne turnaround phase. Referring again to FIG. 11, the sense of the counts changes from +1 to −1 after the gyro reverses direction. The time intervals $T_A$ and $T_B$ may be recorded and used to calculate the phase value of the heterodyne turnaround based upon the known parameters of the dither motion.

The method of this invention may be applied to ring laser gyros that are not sinusoidally dithered. For example the method described may be applied to generate corrections for a rate biased gyroscope whose rate is periodically reversed. The analytic form of the correction at each reversal is then $$\Delta\Psi = B_L[2\pi(k\alpha)^{-1}]^{\frac{1}{2}}\sin(\phi_H + \epsilon \pm \pi/4)$$

Where $\alpha$ is the acceleration of the gyro at turnaround, and K is the scale factor of the gyro.

What is claimed is:

1. A method for correcting random walk errors caused by coupling between two counterpropagating light beams in a ring laser gyroscope that is body dithered at a frequency $\omega_D$ about a sensor axis at a dither depth $B_m$, the ring laser gyroscope forming a beat signal by interference of the two counterpropagating light beams to indicate rotation by an angle $\Psi$ about the sensor axis, comprising the steps of:

(a) producing a pair of heterodyne signals that are indicative of the phase difference between the two counterpropagating light beams;
   (b) sampling the heterodyne signals to determine the phase difference $\Psi_T = \phi_H + \epsilon$ between the two counterpropagating light beams at rate reversals of the ring laser gyroscope;
   (c) adding signals indicative of the intensities of the two counterpropagating light beams to produce an intensity sum signal;
   (d) demodulating the intensity sum signal with at least one of the sampled heterodyne signals from step (b);
   (e) processing the demodulated intensity sum signal to determine the magnitude $B_L$ of coupling between the two counterpropagating light beams; and
   (f) calculating a correction to the angle of rotation as a function of the coupling $B_L$ between the two beams and the phase difference $\Psi_T = \phi_H + \epsilon$ between the two counterpropagating light beams at rate reversals of the ring laser gyroscope.

2. The method of claim 1, further including the step of determining whether the change in direction at rate reversals is counterclockwise to clockwise or clockwise to counterclockwise.

3. The method of claim 1, wherein the step of determining the magnitude of the coupling between the beams includes the steps of:
   detecting changes in direction of the dither oscillations;
   measuring the intensity of a first one of the beams;
   measuring the intensity of the other of the beams; and
   adding signals indicative of the intensities of the two beams to form a sum signal.

4. The method of claim 3, further including the step of:
   forming a heterodyne signal indicative of the beat frequency produced when the counterpropagating beams interfere with one another; and
   demodulating the sum signal with the heterodyne signal.

5. The method of claim 1 wherein the step of calculating a correction to the angle of rotation includes calculating a correction angle according to the equation $\Delta\Psi_{correction} = B_L[2\pi(B_m\omega_d)^{-1}]^{\frac{1}{2}}\sin(\phi_H + \epsilon \pm \pi/4)$.

6. A system for correcting random walk errors caused by coupling between two counterpropagating light beams in a ring laser gyroscope that is body dithered counterpropagating light beams in a ring laser gyroscope that is body dithered at a frequency $\omega_{hd}$ D about a sensor axis at a dither depth $B_m$, the ring laser gyroscope forming a beat signal by interference of the two counterpropagating light beams to indicate rotation by an angle $\Psi$ about the sensor axis, comprising:

means for producing a pair of heterodyne signals that are indicative of the phase difference between the two counterpropagating light beams;

means for sampling the heterodyne signals to determine the phase difference $\Psi_T=\phi_H+\epsilon$ between the two counterpropagating light beams at rate reversals of the ring laser gyroscope;

means for adding signals indicative of the intensities of the two counterpropagating light beams to produce an intensity sum signal;

means for demodulating the intensity sum signal with at least one of the heterodyne signals corresponding to the most recent rate reversal of the ring laser gyroscope;

means for processing the demodulated intensity sum signal to determine the magnitude $B_L$ of coupling between the two counterpropagating light beams and;

means for calculating a correction to the angle of rotation as a function of the coupling $B_L$ between the two beams and the phase difference a rate reversals of the ring laser gyroscope.

7. The system of claim 6, further including means for determining whether the change in direction at rate reversals is counterclockwise to clockwise or clockwise to counterclockwise.

8. The system of claim 6, wherein the means for determining the magnitude of the coupling between the beams includes:

means for detecting changes in direction of the dither oscillations;

means for measuring the intensity of a first one of the beams;

means for measuring the intensity of the other beams; and means for adding signals indicative of the intensities of the two beams to form a sum signal.

9. The system of claim 8, further including:

means for forming a heterodyne signal indicative of the beat frequency produced when the counterpropagating beams interfere with one another; and means for demodulating the sum signal with the heterodyne signal.

10. The system of claim 6 wherein the means for calculating a correction to the angle of rotation includes means for calculating a correction angle according to the equation $$\Delta\Psi_{correction}=B_L[2\ \pi(B_m\omega_d)^{-1}]^{\frac{1}{2}}\sin\ (\phi_H+\epsilon\pm\pi/4).$$

11. A system for correcting random walk errors in a ring laser gyroscope that is body dithered at a frequency $\omega_D$ and a dither depth $B_m$ about a sensor axis, a beat signal formed by interference of two counterpropagating light beams indicating rotation of an angle $\Psi$ about the sensor axis, comprising:

means for producing a pair of heterodyne signals indicative of the light intensity resulting from interference of the two light beams;

a turnaround detector connected to the means for producing a plurality of heterodyne signals, the turnaround detector including means for detecting phases of the heterodyne signals when the dither oscillations change direction and including means for determining whether the change in direction of the dither oscillations is clockwise to counterclockwise or counterclockwise to clockwise;

means for producing an intensity sum signal indicative of the sum of the intensities of the two light beams; and an intensity demodulator means for demodulating the intensity sum signal with the heterodyne signals output from the turnaround detector, the intensity demodulator including means for determining the magnitude of coupling between the two light beams and for determining the phase difference between the heterodyne signals and the intensity sum signal.

12. A method for reducing the random walk error of a ring laser gyroscope being body dithered at a frequency $\omega_D$ and having a dither depth $B_m$ about a sensor axis with a beat signal formed by interference of two counterpropagating light beams indicating rotation of an angle $\Psi$ about the sensor axis, comprising the steps of:

measuring the phase of optical signals input to a pair of heterodyne detectors which detect the interference of the two counterpropagating beams;

producing an intensity sum signal indicative of the sum of the intensities of the two counterpropagating light beams;

measuring temperature-induced changes in phase of the intensity sum signal; and processing the temperature-induced changes in phase of the intensity sum signal to calibrate the output of the ring laser gyroscope to compensate for temperature-induced phase changes in the two counterpropagating beams.

13. The method of claim 12, further including the steps of:

accumulating the temperature-induced phase difference as integer multiples of $2\pi$; and associating each complete $2\pi$ change in the temperature-induced phase difference with a one count error in the output of the ring laser gyroscope.

14. A system for reducing the random walk error of a ring laser gyroscope being body dithered at a frequency $\omega_D$ and having a dither depth $B_m$ about a sensor axis with a beat signal formed by interference of two counterpropagating light beams indicating rotation of an angle $\Psi$ about the sensor axis, comprising the steps of:

means for measuring the phase of optical signals input to a pair of heterodyne detectors which detect the interference of the two counterpropagating beams;

means for producing an intensity sum signal indicative of the sum of the intensities of the two counterpropagating light beams;

means for measuring temperature-induced changes in phase of the intensity sum signal; and processing the temperature-induced changes in phase of the intensity sum signal to calibrate the output of the ring laser gyroscope to compensate for temperature-induced phase changes in the two counterpropagating beams.

15. The method of claim 14. including:

means for accumulating the temperature-induced phase difference as integer multiples of $2\pi$; and means for associating each complete $2\pi$ change in the temperature-induced phase difference with a one count error in the output of the ring laser gyroscope.

* * * * *